2,694,072

CONTINUOUS PROCESS FOR THE MANUFACTURE OF AMIDES

William H. von Glahn, Loudonville, and Charles H. Stratton, East Greenbush, N. Y., assignors to General Aniline & Film Corporation, New York, N. Y., a corporation of Delaware No Drawing. Application December 22, 1951, Serial No. 263,018

12 Claims. (Cl. 260—315)

This invention relates to an improved process for making carboxylic acid amides and more particularly to a continuous process employing tertiary amines as a solvent.

One of the most widely employed processes for manufacturing carboxylic acid amides is by a batch process in which a carboxylic acid and an aromatic amine are reacted in the presence of a condensing agent such as phosphorus trichloride and an inert hydrocarbon solvent. This procedure has several disadvantages. The use of toluene or other hydrocarbon solvents is hazardous because of the well-known flammable and toxic nature of the solvents. Accordingly, these hazards make it necessary to take expensive precautions as regards equipment, housing, etc. Since the reaction is not completed until the by-product hydrogen chloride is boiled out of the reaction vessel, an unduly long reaction time is necessary, in some cases up to 24 hours or longer. Further, the evolved hydrogen chloride must be removed from the effluent gases in order to avoid heavy and dangerous atmospheric pollution. The recovery of such a highly corrosive material is expensive, both as to initial cost and to maintenance of the equipment. In addition, the prolonged contact of the hot acidic reagents with both the desired product and the reaction vessels often causes a deterioration in the quality of the product and corrosion to the equipment.

A second well known process is a batch process in which the carboxylic acid is converted to the corresponding acid chloride and the latter then condensed with the amine. A third known process is similar to the foregoing process except that the acid is converted to the ester instead of to the acid chloride. A fourth known process involves a batch process in which a Naphthol-AS intermediate such as 2,3-hydroxynaphthoic acid is reacted with an aromatic amine in the presence of a condensing agent such as PCl₃ and an excess of the aromatic amine as solvent. A fifth known process involves a batch process in which a Naphthol-AS intermediate such as 2,3-hydroxynaphthoic acid is reacted with an aromatic amine in a tertiary amine in the presence of a condensing agent such as PCl₃. All of these aforementioned known processes are batch processes possessing most of the disadvantages described with respect to the first-named known process. In addition, the said second and third named processes are two-step expensive procedures, the latter process additionally requiring prolonged heating. The fourth process is inoperable on a plant scale when the amine compound used as both reactant and solvent has a high melting point. The fifth process is hazardous when employed on a plant scale because of spontaneous explosions of the gases collecting over the reaction mass.

An object of this invention is to correct the foregoing deficiencies of the previously-employed batch processes. Another object is to provide an improved process for preparing carboxylic acid amides. Other objects and advantages will appear as the description proceeds.

The accomplishment of these objects is made possible by the instant invention in which a carboxylic acid, a primary or secondary amine, phosphorus trichloride, or equivalent condensing agent, and a tertiary amine as a solvent and hydrogen chloride acceptor are continuously fed into a reaction zone in the presence of an inert atmosphere. The reaction mixture containing the desired amide is continuously removed from the reaction zone and worked up in the usual manner.

The process of this invention minimizes or eliminates the deficiencies of the batch processes aforementioned. The fire hazard is no longer present since the highly flammable hydrocarbon solvents are not employed, the continuous flow of substances prevents accumulation of hazardous gases and the inert atmosphere prevents explosions. The by-product hydrogen chloride has no deteriorating effect on the quality of the desired product or on the equipment since the formed hydrogen chloride is taken up by the tertiary amine to form its hydrogen chloride salt. Since no gaseous hydrogen chloride is formed, no provision for an expensive scrubbing and/or recovery plant need be made. The reaction time is shortened considerably since the hydrogen chloride is taken up by the amine as soon as it is formed, thus permitting the condensation to go to completion rapidly, and in general in less than about two hours. Because of the continuous movement of the reaction mixture the building up of skin and incrustation on the equipment is minimized or eliminated. For the same reason the heat transfer from the heat source is greatly improved, thereby facilitating completion of the reaction in the shortest possible time and the production of a product of high, uniform quality. The reaction conditions are more closely controlled through more accurate control and maintenance of constant proportions of reactants present at any moment in the reaction zone, temperature conditions, and the like. Because of more efficient use of the equipment, the equipment cost per ton of product is less than for the batch process. The labor cost per ton of product is also less, since the operation is largely automatic and the actual reaction time is short.

In general, in operating the process the necessary components, namely carboxylic acid, amine reactant, condensing agent, and tertiary base, are simultaneously and continuously charged in the proper ratios and at the proper rates into one or a series of reaction vessels constructed in such a way that the various components are quickly mixed and maintained at the proper reaction temperature for the necessary time, and the completed reaction mixture containing the desired amide is continuously removed therefrom. The amide may then be separated from the reaction mixture in any known manner, batch-wise, but preferably continuously, as by continuous drowning in water and acid, filtering, and washing.

The preferred carboxylic acids employed are the aromatic o-hydroxy carboxylic acids, such as 3-hydroxy-2-naphthoic acid. However, other aliphatic, aromatic and heterocyclic carboxylic acids may be employed, such as acetic acid, butyric acid, palmitic acid, benzoic acid, m-nitrobenzoic acid, p-chlorobenzoic acid, o-anisic acid, salicyclic acid, terephthalic acid, 3-bromo-4-hydroxy benzoic acid, 2,4-dihydroxy benzoic acid, 4-methoxy benzoic acid, 5,6,7,8-tetrahydro-3-oxy-2-naphthoic acid, 2-hydroxy-3-dibenzofurancarboxylic acid, 3-oxy-2-anthroic acid, 2-hydroxy-11H-benzo[α]carbazole-3-carboxylic acid, 2-hydroxycarbazole-3-carboxylic acid and the like. It is sometimes more feasible to add the carboxylic acid in the form of its alkali metal, alkali earth metal, or tertiary amine salt, as for example the salts of sodium, potassium, calcium, magnesium, zinc, dimethylaniline, and the like. Since such salts are substantially equivalent to and react as the corresponding acids with the amine reactant, the term "carboxylic acid" when employed herein and in the appended claims is intended to include both the carboxylic acid and its alkali metal, alkali earth metal and tertiary amine salts.

It will of course be understood that the carboxylic acid may contain inert substituents which do not interfere with the progress of the desired reaction in the process of this invention.

The preferred amine reactant is aniline, but other primary and secondary aliphatic, aromatic and heterocyclic amines may also be employed, as for example cyclohexyl amine, dicyclohexylamine, n-octyl amine, dimethylamine, the toluidines, the xylidines, the chloroanilines, the nitroanilines, alkylthioanilines, methyl-4-chloroanilines, the anisidines, the phenetidines, aromatic diamines such as phenylenediamines, benzidines and the like, 2,5-dimethoxyaniline, 2-methyl-4-methoxyaniline, 2-methyl- 5-methoxyaniline, 5-chloro-2-methoxyaniline, 4-chloro-2,5-dimethoxyaniline, 5-chloro-2,4-dimethoxyaniline, the naphthylamines, 3-amino-2-methoxy-dibenzofuran, aminothiophene, 2-amino-6-ethoxy-benzothiazole, and the like. The amine may be introduced in the less preferred form of its mineral acid salt. It will of course be understood that the amine reactant may contain inert substituents which do not interfere with the progress of the desired reaction in the process of this invention.

While N,N-dimethylaniline is the preferred tertiary amine for use as solvent and hydrogen chloride acceptor, other aliphatic, aromatic and heterocyclic tertiary amines which are liquid under the operating conditions of this process and which contain only C, H, and N may be substituted therefor, as for example N,N-diethylaniline, N,N-methylethylaniline, N,N-dimethyl- and N,N-diethyl-toluidines, tributylamines, N,N-dimethylbenzylamine, picolines, N,N-dimethylcyclohexylamine, pyridine, and the like.

In general, the amine reactant and the carboxylic acid are introduced in equivalent quantities, although it may be convenient and economical in some instances to have an excess of the cheaper reagent. It is generally sufficient to introduce phosphorus trichloride in a molar ratio of about 0.44 to 0.50 per primary or secondary amino group. However, if water is present in the reagents, more phosphorus trichloride must be added to compensate for that lost by the decomposition of the phosphorus trichloride by reaction with the water. The presence of more than slight amounts of water is obviously undesirable. Generally, it is of advantage to use about three moles of tertiary amine for each mole of phosphorus trichloride. If a carboxylic acid salt is used instead of the free acid, only two moles of the tertiary amine are theoretically necessary to take up the evolved hydrogen chloride. However, it is preferable to use an excess of tertiary amine in order to give the reaction mixture sufficient fluidity. Equivalent amounts of phosphorus oxychloride may be used instead of the phosphorus trichloride, but the latter condensing agent is preferred.

The process is carried out under atmospheric pressure and in the presence of an inert atmosphere such as nitrogen, carbon dioxide, carbon tetrachloride gas, etc. or mixtures thereof. It has been found that use of an inert atmosphere is important both as a safety measure to reduce combustion and explosion hazards by exclusion of air and also to reduce the oxidation of the primary or secondary amine, such an aniline, resulting in darkening of the product. The inert atmosphere above the reaction mixture in the reaction zone may be maintained by continuously passing therethrough an inert gas of the type aforementioned.

The temperature is usually kept at from about 60 to 90° C. However, a lower temperature could be employed if the reaction time is extended as by decreasing the throughput rate and/or increasing the length of the reaction zone. Similarly, a higher temperature could be used, such as from 100–120° C. in order to shorten the reaction time, although this is not highly desirable for safety and other reasons. In the initial stage of the reaction there is sufficient heat given off in the reaction between the phosphorus trichloride and the primary or secondary amine to maintain a satisfactory temperature of about 60 to 80° C. However, after this initial stage, the heat of reaction is usually insufficient and it is necessary to supply heat in order to maintain a preferred temperature of about 80 to 90° C. For this reason, it has been found practical to separate the reaction zone into two portions, in the first of which the initial exothermic reaction takes place, and in the second of which heat may be added from some suitable source, such as infra-red lamps, electrical heating, steam or hot water jackets, etc. It may be advisable in some instances to keep the temperature of the initial mixing or reaction zone below 76° C., the boiling point of phosphorus trichloride to prevent it from boiling off before reacting. As has been stated previously, the reaction time is relatively short, the average retention time of the reaction mixture in the reaction zone being about two hours or less.

The nature of the reactants will, of course, determine the manner of their addition into the reaction zone, as, for example, in a solid or liquid state. Thus, in the case of the alkali and alkali earth metal salts of carboxylic acids, many of them are not highly soluble in the tertiary amine solvent and, accordingly, may be added to the reactor as solids. However, where possible, it is preferable to add the reactants in a liquid state to promote rapid mixing and reaction.

It has also been found that in order to shorten the time needed to bring the reaction mixture in the reaction zone to equilibrium the reaction zone preferably should be charged with a completed batch reaction mixture instead of with the tertiary amine solvent. Thus, in the manufacture of Naphthol-AS, a batch process was run and the completed batch mixture was employed to fill the reaction zone before starting the herein described continuous process therethrough. In this manner it is possible to obtain constant yield control right from the beginning instead of having to wait until the reaction equilibrium in the reactor becomes constant.

Although in some instances the movement of the reaction mixture in the reaction zone supplies sufficient agitation, it is usually necessary to provide agitating means therein in order to assure the more rapid mixing and heat transfer necessary for a completion of the reaction in the shortest possible time. Any of the well-known means of agitating reaction mixtures may be used, as for example, propeller agitators placed at intervals in the reaction zone, a concentric shaft provided with scraping blades operating in a rotating or rocking motion, and the like.

The apparatus may take the form of a single tube-like reactor, usually horizontal, provided with a baffle between the initial mixing or reaction zone and the main reaction zone, a cascade of stirred kettles where the reaction mass flows by gravity from one kettle to the next, a stirred vertical tube overflowing at the top, the starting components being pumped in at or near the bottom, etc. Of course, the apparatus must be constructed of material resistant to the chemical action of the materials to be passed therethrough.

The following examples are illustrative only of the instant invention and are not to be regarded as limitative:

*Example 1*

This example illustrates the production of 3-oxy-2-naphthanilide (Naphthol-AS). The body of the reactor was a horizontal, Pyrex tube provided with a baffle separating the initial mixing or reaction zone from the main reaction zone. The mixing zone was provided with one thermometer and two propeller agitators and the reaction zone was provided with three thermometers and three propeller agitators arranged at intervals. The reaction zone was heated by three infra-red lamps. The 3-oxy-2-naphthoic acid was dissolved in N,N-dimethylaniline in the ratio of 188 grams (one mol) to 300 grams and the various feeds were adjusted to the following rates:

3-oxy-2-naphthoic acid solution
    555 g. of solution per hour=1.137 moles of 3-oxy-2-naphthoic acid per hour
Phosphorus trichloride
    68.6 g. per hour=0.5 mole/hour
Aniline
    120 g. per hour=1.29 mols/hour Before starting the run a two mole batch process was made. The final volume of the reaction mixture was 1210 ml., 865 ml. of which were used to fill the tube at the start. The average retention time is then about 1¼ hours. The purpose in filling the tube was to shorten the time needed to bring the reaction mixture in the tube to equilibrium.

Previous to starting the feeds, the agitators were started at 450 R. P. M. The temperatures were controlled by varying the voltage in the infra-red lamps. During the course of an eight-hour run the thermometers reading from left to right or from feed end to exit end did not vary more than three degrees from 86° C., 93° C., 95° C. and 95° C.

The three feeds were started simultaneously and kept running for eight hours while continuously feeding nitrogen through the reactor. Each hour's delivery was collected and worked up separately by the following procedure:

(1) Drowning in water and hydrochloric acid
(2) Filtering (3) Washing with 1–5% hydrochloric acid to remove dimethylaniline
(4) Washing with hot water to remove hydrochloric acid and unreacted 3-oxy-2-naphthoic acid
(5) Drying in vacuum The product 3-oxy-2-naphthanilide gave a clear solution in aqueous sodium hydroxide and was suitable for all purposes.

The five steps enumerated above were not done continuously in our experiments since adequate descriptions of such operations are available in the literature. In all the following examples, the product was also worked up batchwise.

*Example 2*

In this experiment the 3-oxy-2-naphthoic acid was dissolved in N,N-dimethylaniline in the ratio of 188 grams=1 mole to 400 grams and fed at a rate of 646 g. of solution per hour=1.1 moles of 3-oxy-2-naphthoic acid per hour. Phosphorus trichloride was fed in at the rate of 71 g. per hour=0.516 mole per hour. In place of aniline, o-toluidine was fed in at the rate of 118 g. per hour=1.1 moles per hour. The reaction was run exactly as in Example 1 with the following exceptions: The last three agitators were slowed down to 136 R. P. M. while the thermometers reading from left to right were kept within 3° of 82° C., 88° C., 91° C., 92° C. The reaction mixture was drowned into hydrochloric acid 20° Bé. To this was added water. The precipitated product was worked up as before. The quality of the final product was very satisfactory.

*Example 3*

This experiment was conducted as in Example 2 except that 2-anisidine, fed in at the rate of 135.3 g. per hour=1.1 moles per hour, was substituted for the 2-toluidine. The reaction mass was then worked up as described in the previous examples. An easily filterable precipitate was obtained. The product was of good quality.

*Example 4*

This experiment was conducted as in Example 2 except that 2-phenetidine, fed in at the rate of 169 g.=1.23 moles per hour, was substituted for the 2-toluidine. The reaction mass was worked up as described before. The filtration and washing were done as before. The product was of satisfactory quality.

*Example 5*

In this experiment a solution of 188 grams of 3-oxy-2-naphthoic acid in 400 g. of N,N-dimethylaniline was fed in at the rate of 147 g. of solution per hour=0.25 mole of 3-oxy-2-naphthoic acid per hour. A solution of 138 g. m-nitroaniline in 1500 g. N,N-dimethylaniline was fed in at a rate of 462 g. per hour=.28 mole of m-nitroaniline per hour, while the phosphorus trichloride was fed in at a rate of 15.8 g. per hour=0.115 mole per hour.

The tube was first filled with a preformed batchwise reaction mass as was done in the previous examples. The first two agitators on the left were adjusted to 450 R. P. M. while the last three were adjusted to 136 R. P. M. All agitators were running clockwise.

The three feeds were then started simultaneously and kept going for several hours. The thermometers reading from left to right were kept at about 66°, 81°, 85°, and 88° C., respectively.

The reaction mixture was slowly added to hydrochloric acid 20° Bé. Water was then added slowly and the mixture was digested for half an hour at 85–90° C. The product was then removed by filtration and washed with hot dilute hydrochloric acid and then with hot water. The 3′-nitro-3-oxy-2-naphthanilide so produced was of good quality.

*Example 6*

In this experiment the phosphorus trichloride and 3-oxy-2-naphthoic acid were fed as in Example 5. Instead of nitrogen, carbon dioxide was continuously passed through the reactor. A solution of 143 g. β-naphthylamine in 1150 g. N,N-dimethylaniline was substituted for the m-nitraniline solution. This solution was fed in at a rate of 324 g. per hour=0.25 mole of β-naphthylamine per hour. The experiment was done substantially as in Example 5 except that the reaction mixture discharged from the tube was drowned directly into a water-hydrochloric acid mixture. The Naphthol AS-SW produced was of satisfactory quality.

*Example 7*

In this experiment 2-hydroxycarbazole-3-carboxylic acid was condensed with aniline. Aniline was fed in at a rate of 26.4 g. per hour=0.284 mole per hour while phosphorus trichloride was fed at the rate of 15.8 g. per hour=0.115 mole per hour. The 2-hydroxycarbazole-3-carboxylic acid was dissolved in N,N-dimethylaniline in a ratio of 277 grams to 2030 grams. This mixture was fed at the rate of 560 g. per hour=.25 mole of the carboxylic acid per hour. The technique of running the reaction and working it up were the same as in Example 5.

*Example 8*

In this experiment we are concerned with the production of salicylanilide. A solution of 138 g. salicylic acid in 414 g. N,N-dimethylaniline was fed at a rate of 624 g. per hour=1.13 moles of salicylic acid per hour. The aniline was fed at a rate of 115 g. per hour=1.24 moles per hour while the phosphorus trichloride was fed at a rate of 71 g. per hour=0.516 mole per hour. The procedure of running the reaction and working it up were the same as in Example 5.

*Example 9*

In this experiment a solution of 188 g. 3-hydroxy-2-naphthoic acid in 500 g. N,N-dimethylaniline was fed at a rate of 688 g. per hour=1 mole 3-hydroxy-2-naphthoic acid per hour. A continuous solid feeder was used to feed 2-amino-6-ethoxybenzothiazole at a rate of 194 g. per hour while the phosphorus trichloride was fed at a rate of 64.8 g. per hour. Otherwise the experiment was conducted as in Example 1.

*Example 10*

In this experiment dry sodium-3-hydroxy-2-naphthoate was fed at a rate of 210 g.=1 mole per hour. A solution of 93 g. aniline in 400 g. N,N-dimethylaniline was fed at a rate of 493 g. per hour=1 mole aniline per hour while the phosphorus trichloride was fed at a rate of 65 g.=0.47 mole per hour. Otherwise the reaction was run as in Example 1. The product was equal in quality to that produced in Example 1.

*Example 11*

In this experiment a solution of 188 g. 3-hydroxy-2-naphthoic acid in 500 g. N,N-dimethylaniline was fed at a rate of 344 g. per hour=0.5 mole 3-hydroxy-2-naphthoic acid per hour. A continuous solid feeder was used to feed solid m-phenylenediamine at the rate of 27.5 g. per hour=0.25 mole per hour while the phosphorus trichloride was fed at the rate of 32.4 g.=0.236 mole per hour. Otherwise the experiment was conducted as in Example 1. The product was of good quality.

*Example 12*

In this experiment N,N-dimethylaniline was fed at a rate of 250 g. per hour, while dry sodium 3-hydroxy-2-naphthoate was fed at a rate of 105 g. per hour=0.5 mole per hour and solid p-phenylene diamine was fed at the rate of 27.5 g. per hour=0.25 mole per hour. Otherwise the experiment was conducted as in Example 1. The product was of good quality.

*Example 13*

Same as in Example 10 with the exception that 2-hydroxy-dibenzofurane-3-carboxylic acid was substituted for the sodium-3-hydroxy-2-naphthoate. The product was of good quality.

*Example 14*

Same as in Example 10 with the exception that 3-oxy-2-anthroic acid was substituted for the sodium-3-hydroxy-2-naphthoate. The product was of good quality.

*Example 15*

Same as in Example 10 with the exception that 2-hydroxy-11H-benzo[a]carbazole-3-carboxylic acid was substituted for the sodium-3-hydroxy-2-naphthoate. The product was of good quality.

We claim:

1. A continuous process of producing carboxylic acid amides which comprises continuously feeding into a reaction zone a carboxylic acid and an amine reactant selected from the group consisting of primary and secondary amines in about equivalent amounts, a liquid tertiary amine and a condensing agent selected from the group consisting of phosphorus trichloride and phosphorus oxychloride, in the presence of an inert atmosphere, and continuously removing the reaction product from the reaction zone upon completion of the reaction.

2. A continuous process for producing Naphthol AS which comprises continuously feeding 3-hydroxy-2-naphthoic acid and aniline in about equimolar amounts, N,N-dimethylaniline and phosphorus trichloride into a reaction zone containing an inert atmosphere and maintained at a temperature of about 60 to 90° C. and continuously removing the reaction mixture containing the Naphthol AS from the reaction zone upon completion of the reaction.

3. The process of claim 1 in which the carboxylic acid is employed in the form of its salt.

4. The process of claim 1 in which said amine reactant is employed in the form of its mineral acid salt.

5. A continuous process for producing mono-N-substituted aromatic carboxylic acid amides which comprises continuously feeding into a reaction zone an o-hydroxy carboxylic acid and a primary aromatic amine in about equivalent amounts, a liquid tertiary aromatic amine and phosphorus trichloride, in the presence of an inert atmosphere, and continuously removing the reaction products from the reaction zone upon completion of the reaction.

6. A continuous process for producing 3-hydroxy-2-naphthoyl-β-naphthylamide which comprises continuously feeding 3-hydroxy-2-naphthoic acid and 2-naphthylamine in about equimolar amounts, N,N-dimethyl-aniline and phosphorus trichloride into a reaction zone containing an inert atmosphere and maintained at a temperature of about 60 to 90° C. and continuously removing the reaction mixture containing the Naphthol AS–SW from the reaction zone upon completion of the reaction.

7. The process of claim 5 in which the carboxylic acid is 3-hydroxy-2-naphthoic acid.

8. The process of claim 5 in which the carboxylic acid is 2-hydroxydibenzofuran-3-carboxylic acid.

9. The process of claim 5 in which the carboxylic acid is 3-oxy-2-anthroic acid.

10. The process of claim 5 in which the carboxylic acid is 2-hydroxy-11H-benzo[a]carbazole-3-carboxylic acid.

11. The process of claim 5 in which the carboxylic acid is 2-hydroxycarbazole-3-carboxylic acid.

12. The process of claim 5 in which the reaction zone is initially charged with a completed reaction mixture from a batch process for producing the same amide.

References Cited in the file of this patent

UNITED STATES PATENTS

| Number | Name | Date |
|---|---|---|
| 2,071,702 | Muth | Feb. 23, 1937 |
| 2,186,769 | Schirm | Jan. 9, 1940 |
| 2,468,600 | Lecher et al. | Apr. 26, 1949 |